(12) United States Patent
Teradaira et al.

(10) Patent No.: US 7,120,812 B2
(45) Date of Patent: Oct. 10, 2006

(54) POWER SUPPLY CONTROL APPARATUS AND POWER SUPPLY CONTROL METHOD

(75) Inventors: Mitsuaki Teradaira, Shiejiri (JP); Toshiki Takei, Okaya (JP); Tadayuki Okamoto, Matsumoto (JP)

(73) Assignee: Seiko Epson Corporation, (JP)

( * ) Notice: Subject to any disclaimer, the term of this patent is extended or adjusted under 35 U.S.C. 154(b) by 12 days.

(21) Appl. No.: 11/078,770

(22) Filed: Mar. 11, 2005

(65) Prior Publication Data

US 2005/0200313 A1    Sep. 15, 2005

(30) Foreign Application Priority Data

Mar. 11, 2004    (JP)    ............................. 2004-069643

(51) Int. Cl.
    *G06F 1/26*    (2006.01)
(52) U.S. Cl. ..................................................... 713/340
(58) Field of Classification Search ...................... None
    See application file for complete search history.

(56) References Cited

U.S. PATENT DOCUMENTS

| | | | |
|---|---|---|---|
| 4,635,195 A | 1/1987 | Jeppesen, III et al. | |
| 4,663,539 A | 5/1987 | Sharp et al. | |
| 4,677,566 A | 6/1987 | Whittaker et al. | |
| 5,706,411 A | 1/1998 | McCormick et al. | |
| 6,285,178 B1 * | 9/2001 | Ball et al. .................... | 323/351 |
| 6,328,410 B1 | 12/2001 | Kawase et al. | |
| 6,364,442 B1 | 4/2002 | Kawase et al. | |
| 6,389,544 B1 | 5/2002 | Katagiri | |
| 6,511,150 B1 | 1/2003 | Yoda et al. | |
| 6,580,520 B1 | 6/2003 | Teradaira et al. | |

FOREIGN PATENT DOCUMENTS

| | | |
|---|---|---|
| EP | 0 652 533 A2 | 11/1994 |
| JP | 56-147214 | 11/1981 |
| JP | 03-012722 | 1/1991 |
| JP | 07-195801 | 8/1995 |
| JP | 08-286862 | 11/1996 |
| JP | 09-011452 | 1/1997 |

(Continued)

OTHER PUBLICATIONS

IBM Technical Disclosure Bulletin vol. 34 No. 8 Jan. 1992 p. 279-278.

Primary Examiner—David Vu
(74) Attorney, Agent, or Firm—Anderson Kill & Olick, PC (57) ABSTRACT

A power supply control apparatus for reducing the frequency of running a specific process in an electronic device when the device power turns on or off too soon after being turned off by monitoring the operating state of the power switch. When the power supply control apparatus detects an operation turning the power to the hybrid processing apparatus 1 off, the power supply control apparatus continues supplying power for as long as needed to complete a given shutdown process. However, if the power supply control apparatus 50 detects an operation turning the device power on again after the power supply stops but before reaching a predetermined reset voltage a reset and restart command is applied to the electronic device. More particularly, if an operation turning the power on again is detected during the period while the power supply is maintained to complete the shutdown process after the operation turning the power off is detected, the command restarts the electronic device without running a process normally run after start up such as a cleaning process in a printer.

8 Claims, 10 Drawing Sheets

FOREIGN PATENT DOCUMENTS

| | | |
|---|---|---|
| JP | 09-185575 | 7/1997 |
| JP | 10-151836 | 6/1998 |
| JP | 10-278381 | 10/1998 |
| JP | 11-208071 | 8/1999 |
| JP | 2000-103145 | 4/2000 |
| JP | 2000-168096 | 6/2000 |
| JP | 2001-249738 | 9/2001 |
| JP | 2003-015780 | 1/2003 |
| JP | 2004-058554 | 2/2004 |
| JP | 2004-219831 | 8/2004 |
| WO | WO99/22941 | 5/1999 |

\* cited by examiner

POWER SUPPLY CONTROL APPARATUS AND POWER SUPPLY CONTROL METHOD

BACKGROUND OF THE INVENTION

1. Field of the Invention

The present invention relates to a power supply control apparatus and a power supply control method for use in an electronic device that runs a particular process when the power supply of the electronic device turns off.

2. Description of Related Art

Electronic devices that run a particular process when the power supply unit of the electronic device turns on or turns off are taught, for example, in Japanese Unexamined Patent Application H09-11452 (see page 7 and FIG. 6) and in Japanese Unexamined Patent Application 2000-168096 (see pages 9–10 and FIG. 11 and FIG. 12).

Japanese Unexamined Patent Application H09-11452 teaches an inkjet printer with a function for appropriately controlling the temperature of the print head. More particularly, this inkjet printer maintains the supply of power to the printer control circuit when the power supply unit turns off, calculates the time required for the print head temperature to stabilize after the power turns off based on such factors as the ambient temperature, manages the temperature of the print head while waiting for the calculated time to pass, and turns off the supply of power to the printer control circuit when the calculated time has elapsed. If the printer power turns on again before the calculated time passes, however, the printer control circuit controls the temperature of the print head to a temperature suitable for ink discharge based on the temperature of the print head when the power supply was turned on again.

Japanese Unexamined Patent Application 2000-168096 teaches an inkjet printer having a function for running a print head cleaning process. More particularly, this inkjet printer stores the status of the cleaning process if the power supply turns off due, for example, to a power outage while cleaning the print head. When the power is restored and the power supply is turned on again, the printer checks a flag denoting whether a cleaning process was interrupted, and runs an initialization process determined by the type of cleaning process that was interrupted if a cleaning process was in progress when the power supply was cut off. For example, a wiping initialization process runs if a wiping process was running just before the power failed, a vacuuming initialization process runs if a nozzle vacuuming process was interrupted, and a rubbing process runs if a rubbing process was interrupted by the power outage.

The purpose of these conventional power supply control methods is to maintain the power supply for a specified period of time after the power supply turns off in order to save data required to resume the operating status of the device before the power supply shut down, or to calculate the time until the temperature of the print head stabilizes. The purpose of these conventional power supply control methods is not to lower the frequency of specific processes when the power supply turns on so that the electronic device (printer) can be used more quickly.

If an electronic device always runs a particular process when the power supply turns on, that process still runs even if the power supply turns on shortly after the power supply turned off, and it is therefore difficult to reduce the frequency of this particular process and thereby enable the electronic device to be used more quickly after the power supply turns on. However, by monitoring whether the power supply turns on again during the period in which the power supply is maintained after the power supply is turned off, a particular process that runs when the electronic device turns on can be omitted if the power supply turns on again during this period when the power supply is maintained after the power supply is turned off.

This conventional power supply control method does not, however, monitor if the power supply is turned on again during the period in which power continues to be supplied.

Some inkjet printers, for example, have a function for cleaning the print head when the power turns on, and such printers always run the cleaning process when the power turns on regardless of whether the power turns on shortly after the power turned off. Furthermore, because the cleaning process of an inkjet printer vacuums and disposes of ink from the print head, and thus consumes ink, turning the power off and on within a short period of time consumes a large amount of ink.

Needless cleaning processes can thus be eliminated by preventing the power supply from turning off even if the power switch is turned off, monitoring if the power is turned on again while the power supply is thus maintained, and not running the cleaning process if the power supply is turned on again during this time. Such a power supply control method is not limited to application in inkjet printers, however, and can be used in any electronic device that runs a particular process when the power supply turns on to similarly reduce the frequency of running said process. Electronic devices that must run a particular process when the power supply turns on shall not, however, be so limited.

Once an electronic device that shuts off the power supply when a specified period of time has passed after the power supply is turned off enters the process for terminating the power supply, the electronic device will not restart the system even if the power supply switch is turned on again before the power supply voltage drops to the reset voltage, and the system remains off even though the power supply switch is in the on position. This is particularly unintuitive and not user friendly when the on/off status of the power supply switch is visually apparent, such as when the power supply switch is a seesaw switch or a push-button switch that is pushed down to a depressed position when on and is pushed again and released to a raised position when off.

Although a mismatch between the position of the power supply switch and the on/off operating status of the system does not occur when the on/off position of the power supply switch is not visually apparent, some other means of informing the user whether the power supply is on or off must be provided, and this increases the cost accordingly.

The present invention is therefore directed to solving the foregoing problems. The power supply control apparatus and power supply control method of the present invention maintains the supply of power in an electronic device for an extended time period after the power supply switch is turned off while monitoring whether the power supply switch has been turned on again during such time period thereby eliminating the frequency of running unnecessary programs that are usually initiated each time the power supply turns on independent of how long a time has expired from the previous shut down of the power supply and assures that the operating (power supply) status of the system matches the position of the power supply switch.

SUMMARY OF THE INVENTION

A power supply control apparatus according to a first aspect of the present invention is adapted for use in an electronic device that runs a specific shutdown process when the power supply in the device turns off, and comprises an on/off operation detection means for detecting when the power supply in the electronic device has been turned on or off; a power maintenance means for continuing to supply power to the electronic device for a specified time period in response to when the power supply in the electronic device is turned off independent of the shutdown process; and a startup process control means for resetting and restarting the the electronic device based upon the time interval between when the power supply in the electronic device has been turned on in comparison to when it has been turned off and said specified time period Preferably, the startup process control means of the power supply control apparatus asserts a command instructing the electronic device to omit a specific startup operation if an operation turning the electronic device on is detected before the period in which power supply to the electronic device is maintained after an operation turning the electronic device power off is detected.

Yet further preferably, the power supply control apparatus also has an illumination means for indicating the switching position of a switch means for turning the power of the electronic device on and off. The illumination means lights steady when the electronic device is in a normal operating state, blinks during the period in which the power supply to the electronic device is maintained for a specified time after the power to the electronic device is turned off, and operates in a state other than lighting steady or blinking until a reset voltage at which the electronic device becomes inoperable is reached after the period in which the power supply to the electronic device is maintained for the specified time passes.

Yet further preferably, the electronic device of the power supply control apparatus has a printing device that cleans the printing unit when device power turns on, and the startup process control means asserts a command instructing the printing device to omit the cleaning process if an operation turning the printing device on is detected before the period in which power supply to the printing device is maintained after an operation turning the printing device power off is detected passes.

Yet further preferably, this power supply control apparatus also has a measuring means for measuring the specified time during which power to the electronic device is maintained after an operation turning the electronic device power off is detected, and a power supply stopping means for stopping the supply of power by the power maintenance means if the specific shutdown process of the electronic device has not ended when the specified time measured by the measuring means has passed.

Another aspect of the present invention is a power supply control method for an electronic device that runs a specific shutdown process when the device power supply turns off. This power supply control method has an on/off operation detection step for detecting an operation that turns the device power supply on or off; a power maintenance step for continuing to supply power to the electronic device for a specified time when an operation turning the device power supply off is detected; and a startup process command output step for outputting a command to reset and restart the electronic device if an operation turning the device power supply on is detected during the period from when an operation turning the device power supply off is detected to when the reset voltage at which the electronic device stops operating is reached.

A further aspect of the present invention is a power supply control program for an electronic device that runs a specific shutdown process when the device power supply turns off, said power supply control program causing a computer to execute: an on/off operation detection procedure for detecting an operation that turns the device power supply on or off; a power maintenance procedure for continuing to supply power to the electronic device for a specified time when an operation turning the device power supply off is detected; and a startup process command output procedure for outputting a command to reset and restart the electronic device if an operation turning the device power supply on is detected during the period from when an operation turning the device power supply off is detected to when the reset voltage at which the electronic device stops operating is reached.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Figure 1:
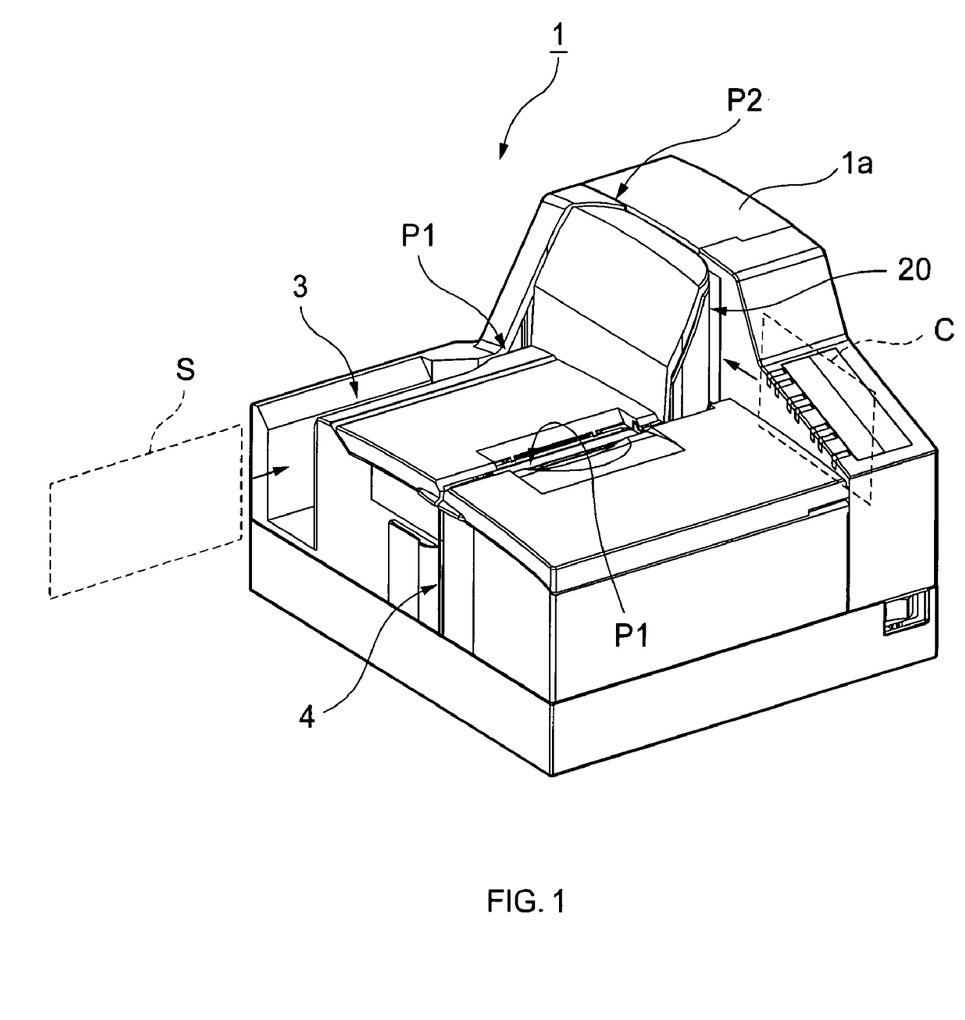
FIG. 1 is an oblique view of a hybrid processing apparatus using a power supply control device according to a preferred embodiment of the present invention.

A preferred embodiment of the hybrid processing apparatus 1 of the present invention is shown in FIG. 1 and includes a first transportation path P1 and a second transportation path P2.

The first transportation path P1 is formed in the housing 1a for conveying slips such as a check S, also referred to herein as a first scanned medium, from the paper supply unit 3 to which the slips are loaded. The second transportation path P2 is also formed in the housing 1a for conveying a card C, also referred to herein as a second scanned medium, from the card insertion opening 20 to which a card is inserted.

More specifically, this hybrid processing apparatus 1 combines the functionality of an optical scanner, magnetic ink character reader (MICR), and printer for optically scanning a check S, magnetically reading magnetic ink characters printed on the check S, and printing on the check S while conveying the check S through the first transportation path P1, and for optically scanning a card C while conveying the card C through the second transportation path P2.

The arrangement of this hybrid processing apparatus 1 is described more specifically below.

Figure 2:
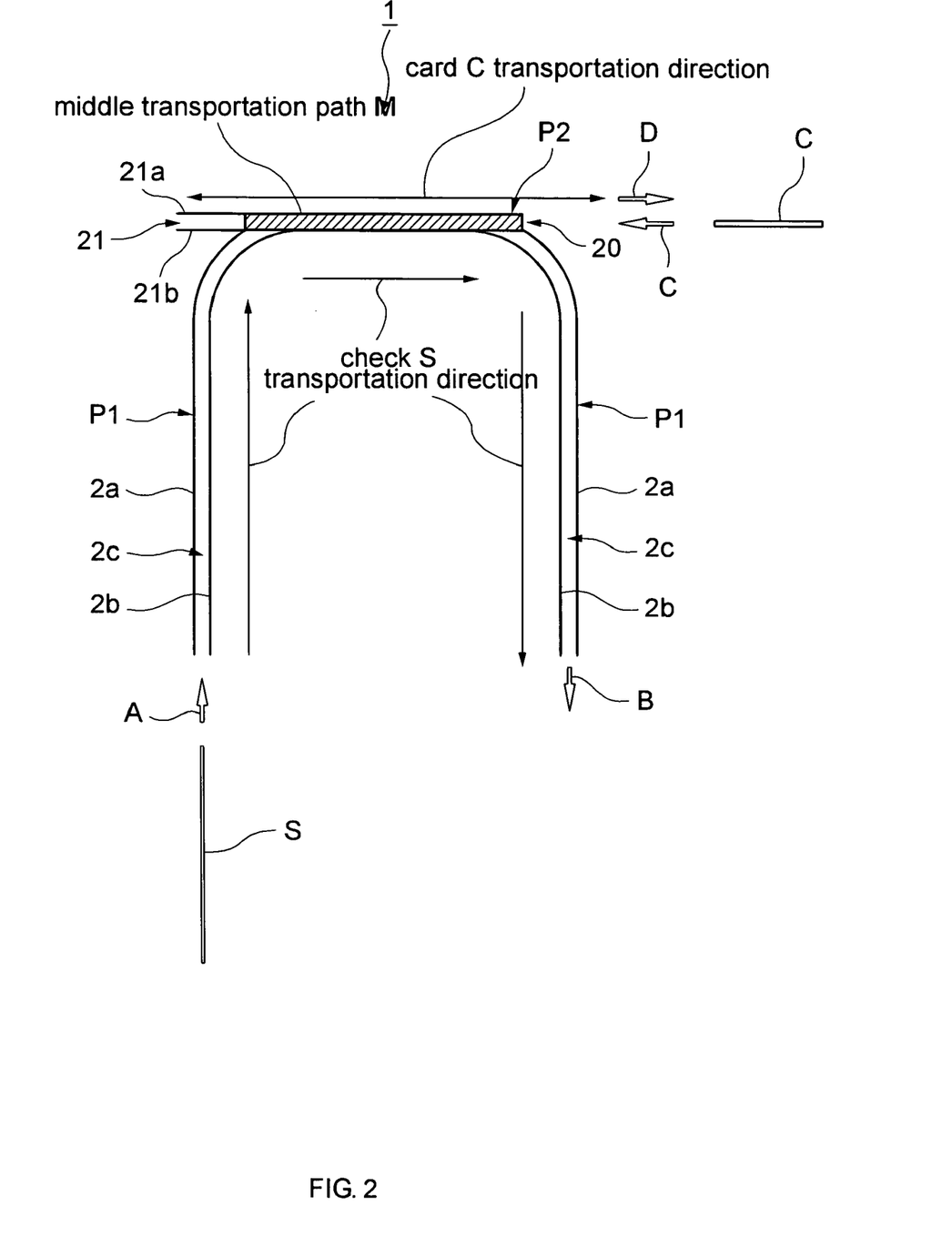
FIG. 2 is a schematic diagram showing the paper transportation path in the hybrid processing apparatus shown in FIG. 1.

As shown in FIG. 2 the first transportation path P1 is substantially U-shaped while the second transportation path P2 is straight for conveying a card C. The first transportation path P1 and second transportation path P2 share the straight portion at the bottom of the U-shaped path, and this area is referred to as the middle transportation path M below. The scanners and MICR devices, which are also referred to as reading devices herein, are disposed to the middle transportation path M. These reading devices are further described below.

Figure 3:
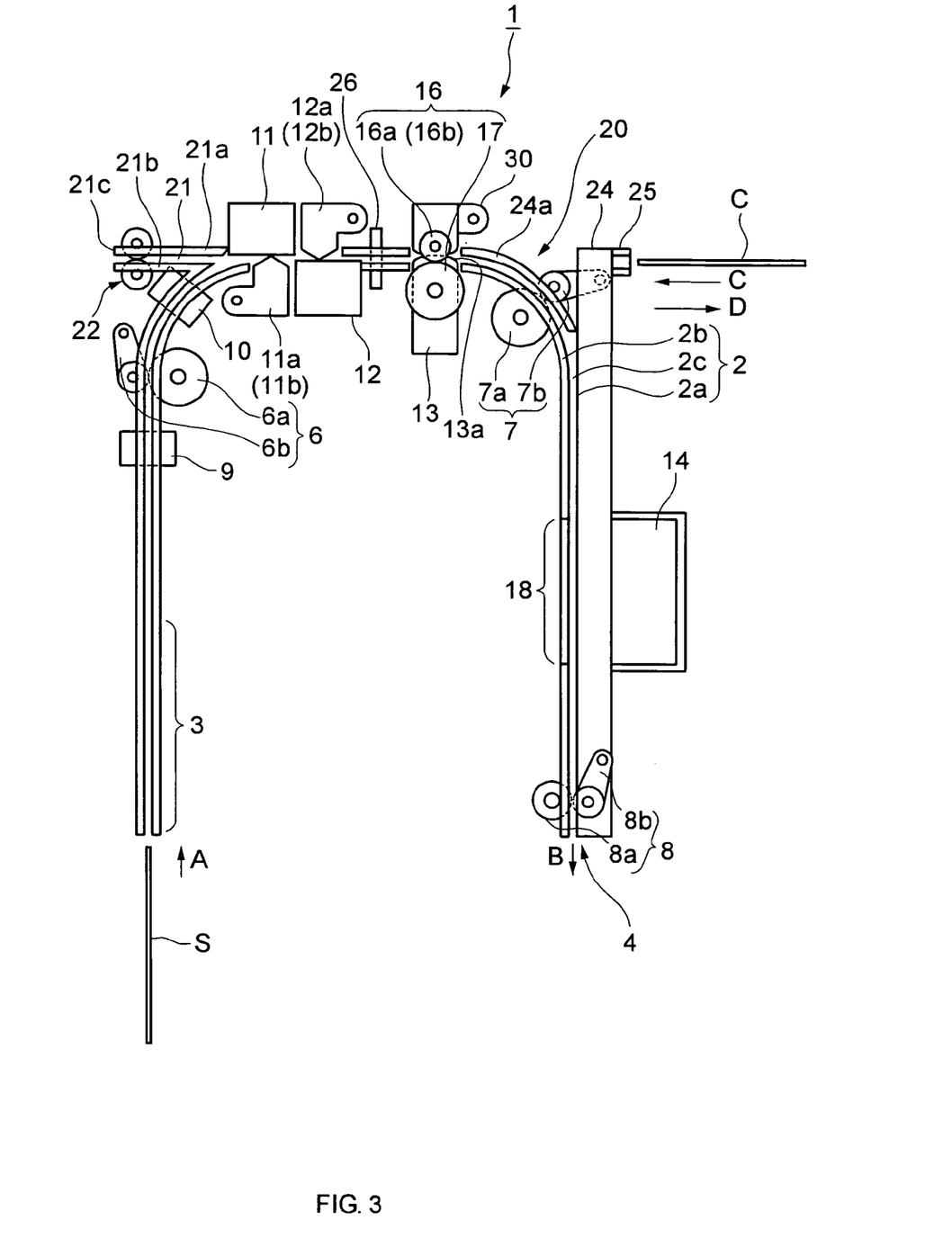
FIG. 3 is a schematic diagram showing the internal arrangement of the hybrid processing apparatus shown in FIG. 1.

As shown in FIG. 2, the first transportation path P1 is defined by an outside guide 2a and an inside guide 2b, and conveys a check S through the transportation part 2c, that is, the space between the outside guide 2a and inside guide 2b. A check S is inserted in the direction of arrow A to the first transportation path P1 from the paper supply unit 3 as shown in FIG. 3. The paper supply unit 3 can stock and consecutively supply multiple checks S one by one into the first transportation path P1.

First transportation rollers 6 located upstream of the middle transportation path M, intermediate transportation rollers 16 located along the middle transportation path M, and second transportation rollers 7 located downstream of the middle transportation path M are disposed to the first transportation path P1 as the transportation mechanism for conveying checks S.

The first transportation rollers 6 include a drive roller 6a and a pressure roller 6b. The pressure roller 6b is disposed opposite the drive roller 6a as a driven roller for pressing the check S to the drive roller 6a.

The second transportation rollers 7 likewise include a drive roller 7a and a pressure roller 7b disposed opposite the drive roller 7a as a driven roller.

As shown in FIG. 3, the intermediate transportation rollers 16 include two coaxial pressure rollers, that is, top pressure roller 16a and bottom pressure roller 16b, disposed orthogonally to the first transportation path P1, and a single drive roller 17 disposed opposite the top pressure roller 16a and bottom pressure roller 16b.

Figure 4:
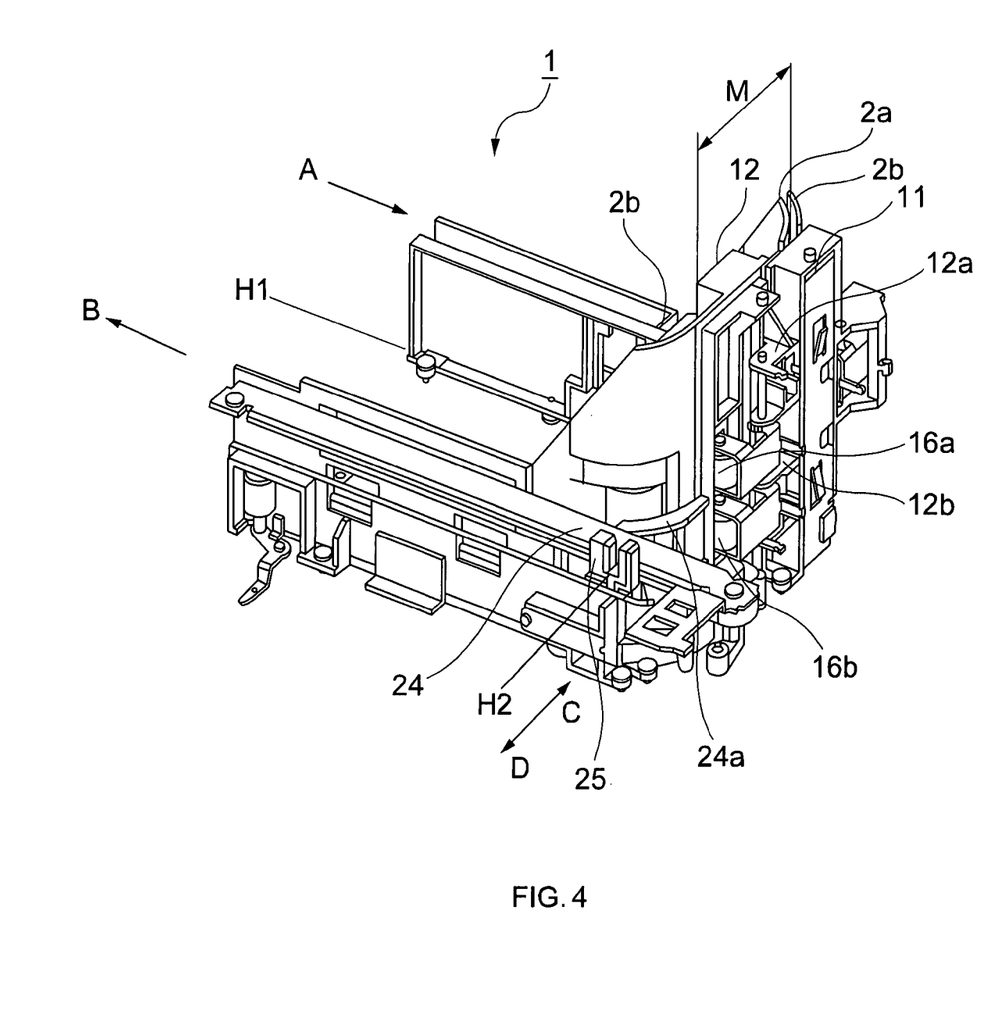
FIG. 4 is an oblique view showing part of the inside of the hybrid processing apparatus shown in FIG. 1.

A check S fed into the first transportation path P1 is conveyed through the middle transportation path M by the first transportation rollers 6, intermediate transportation rollers 16, and second transportation rollers 7 as shown in FIG. 3, and is then discharged from the paper exit 4 in the direction of arrow B by the discharge rollers 8. As shown in FIG. 4, the bottom of the first transportation path P1 is held at a height H1 above the bottom of the hybrid processing apparatus, and a check S is conveyed along the bottom of the first transportation path P1, including the middle transportation path M, at height H1.

If the height of the check S is less than a specified dimension, the bottom pressure roller 16b and drive roller 17 of the intermediate transportation rollers 16 convey the check S. If the height of the check S is greater than or equal to this specified dimension, the top pressure roller 16a, bottom pressure roller 16b, and drive roller 17 convey the check S.

The second transportation path P2 is composed of the middle transportation path M and the card insertion opening 20 and card reversing path 21 disposed at opposite ends of the middle transportation path M.

The card insertion opening 20 is a slot for inserting a card C to the middle transportation path M. Bottom guides 24 and 24a are disposed below the card insertion opening 20 as shown in FIG. 3 and FIG. 4. These bottom guides 24 and 24a are part of the outside guide 2a and hold the bottom edge of the card C at height H2. An inserted card C is guided by bottom guide 24a for insertion to the middle transportation path M, and is conveyed referenced to height H2. More specifically, the bottom of the second transportation path P2 is held by these bottom guides 24 and 24a at a height H2 above the bottom of the hybrid processing apparatus. Note that the direction of a check S held at height H1 as the check S is conveyed through the first transportation path P1 is curved by the bottom guide 24a so that the check S is conveyed to the paper exit 4.

The top pressure roller 16a is disposed at a position above height H2 of the second transportation path P2, and a card C conveyed into the middle transportation path M is transported through the middle transportation path M by the top pressure roller 16a and the drive roller 17.

Figure 5:
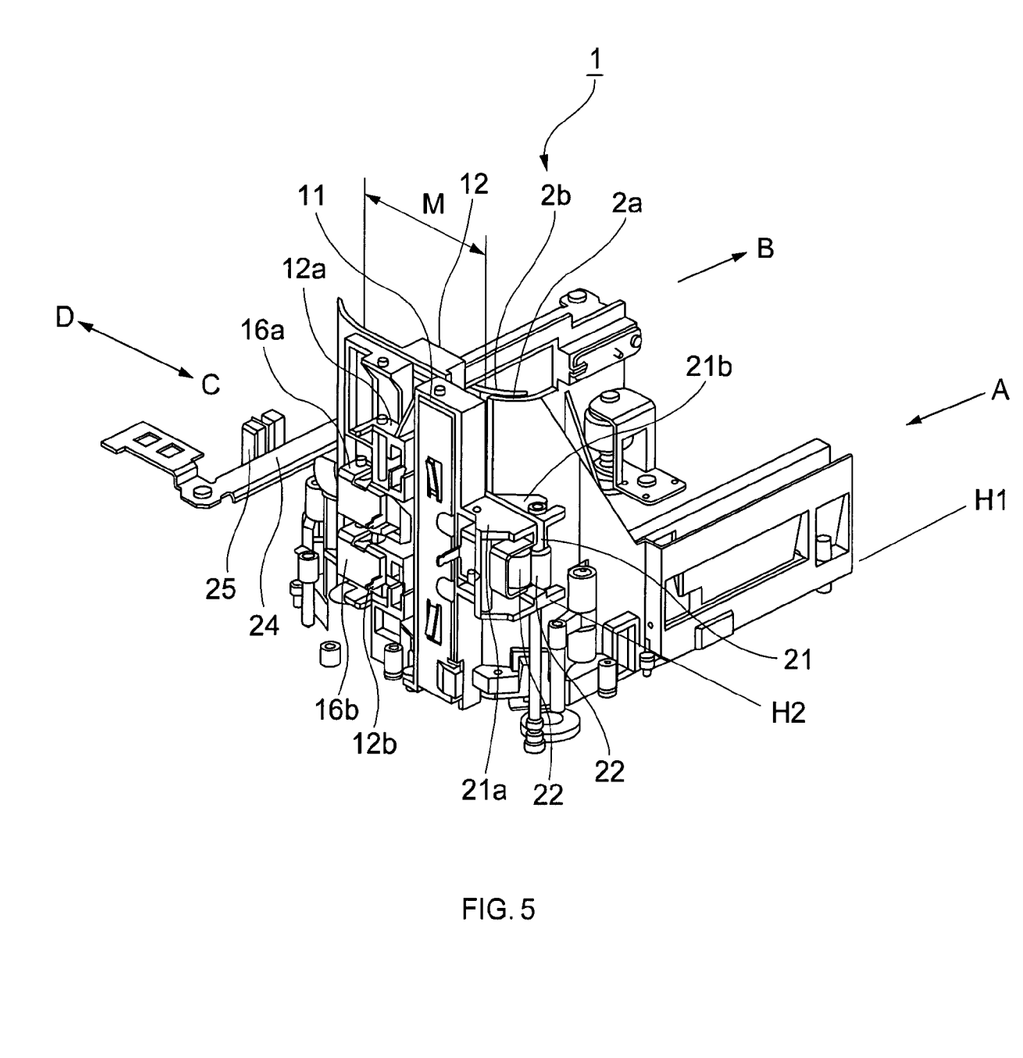
FIG. 5 is an oblique view showing part of the inside of the hybrid processing apparatus shown in FIG. 1.

The card reversing path 21 is formed by straight guides 21a and 21b formed as extensions of the middle transportation path M to the left as seen in FIG. 2. As shown in FIG. 3 and FIG. 5, reversing transportation rollers 22 are disposed near the end portion 21c of the card reversing path 21. The reversing transportation rollers 22 convey a card C transported from the middle transportation path M until the card C overhangs a specified length from the end portion 21c of the card reversing path 21, and then reverse and carry the card C overhanging from the end portion 21c back into the middle transportation path M.

More specifically, when a card C is inserted from the card insertion opening 20 to the middle transportation path M, the card C is conveyed by the top pressure roller 16a and drive roller 17 to the card reversing path 21. The card C is then reversed and conveyed by the reversing transportation rollers 22 from the card reversing path 21, and transported through the middle transportation path M and discharged from the card insertion opening 20. The card C is conveyed through the second transportation path P2 with the bottom edge of the card C held at height H2.

The height (elevation) H2 of the second transportation path P2 is above the height H1 of the first transportation path P1 in this embodiment of the invention. As a result, a card C is conveyed through the middle transportation path M at an elevation above the bottom of a check S.

By thus conveying checks S and cards C at different elevations, a hybrid processing apparatus 1 according to this embodiment of the invention can transport different types of media through a U-shaped first transportation path and a straight second transportation path without using a switching mechanism to change the transportation path.

Transportation of checks S and cards C through a hybrid processing apparatus according to this embodiment of the invention is as described above.

A first image scanning sensor 11 and second image scanning sensor 12 for imaging conveyed media are disposed to the middle transportation path M. Both the first image scanning sensor 11 and second image scanning sensor 12 are contact image sensor (CIS) type image scanners that illuminate one side of the check S or card C travelling through the middle transportation path M and sense the light reflected from the check S or card C. The first image scanning sensor 11 and second image scanning sensor 12 image the check S or card C travelling through the middle transportation path M one line at a time to acquire a two-dimensional image of the check S or card C.

A BOF (bottom of form) detector 9 for detecting the trailing edge of a check S and a TOF (top of form) detector 10 for detecting the leading edge of a check S are disposed to the first transportation path P1.

The BOF detector 9 is located between the paper supply unit 3 and first transportation rollers 6, detects when a check S is inserted from the paper supply unit 3, detects when the check S passes the BOF detector 9, and thus detects the trailing edge of the check S.

The TOF detector 10 is located between the first transportation rollers 6 and first image scanning sensor 11 and detects the trailing edge of the check S. By thus detecting the leading and trailing edges of a check S by means of the BOF detector 9 and TOF detector 10, the length of the check S can be accurately measured.

The hybrid processing apparatus 1 operates according to the length of the check S detected by the BOF detector 9 and TOF detector 10. More specifically, starting and stopping scanning a check S by means of image scanning sensors 11 and 12 is controlled based on output from the BOF detector 9 and TOF detector 10.

Note that either image scanning sensor 11 or 12 can be used to detect the leading edge of the check S, in which case the TOF detector 10 can be omitted.

A printer unit 14 having a print head is disposed to the straight section 18 of the first transportation path P1 between the second transportation rollers 7 and discharge rollers 8. This printer unit 14 is used for printing an endorsement on the back of a check S, and is driven to print on a check S as needed.

A BOC (bottom of card) detector 25 for detecting the trailing edge of a card C, and a TOC (top of card) detector 26 for detecting the leading edge of a card C, are disposed to the second transportation path P2.

The BOC detector 25 is located near the card insertion opening 20 for detecting a card C inserted from the card insertion opening 20. The BOC detector 25 detects when the card C has passed the BOC detector 25 and thus detects the trailing edge of the card C.

The TOC detector 26 is located between the intermediate transportation rollers 16 and second image scanning sensor 12, and detects the leading edge of the card C. The length of a card C can thus be accurately measured as a result of the BOC detector 25 and TOC detector 26 thus detecting the leading and trailing edges of the card C.

The hybrid processing apparatus 1 thus also operates according to the length of the card C detected by the BOC detector 25 and TOC detector 26. More specifically, starting and stopping scanning a card C by means of image scanning sensors 11 and 12 is controlled based on output from the BOC detector 25 and TOC detector 26.

Note that either image scanning sensor 11 or 12 can be used to detect the leading edge of the check S, in which case the TOC detector 26 can be omitted.

As also shown in FIG. 3, a MICR (magnetic ink character reader) 13 is disposed below the drive roller 17. This MICR 13 is a sensor for reading information recorded in magnetic ink on a check S. A pressure lever 30 disposed opposite the MICR 13 with the middle transportation path M therebetween presses a check S to the surface of the MICR 13 to read the magnetic ink characters.

Electrical Configuration of the Hybrid Processing Apparatus 1

Figure 6:
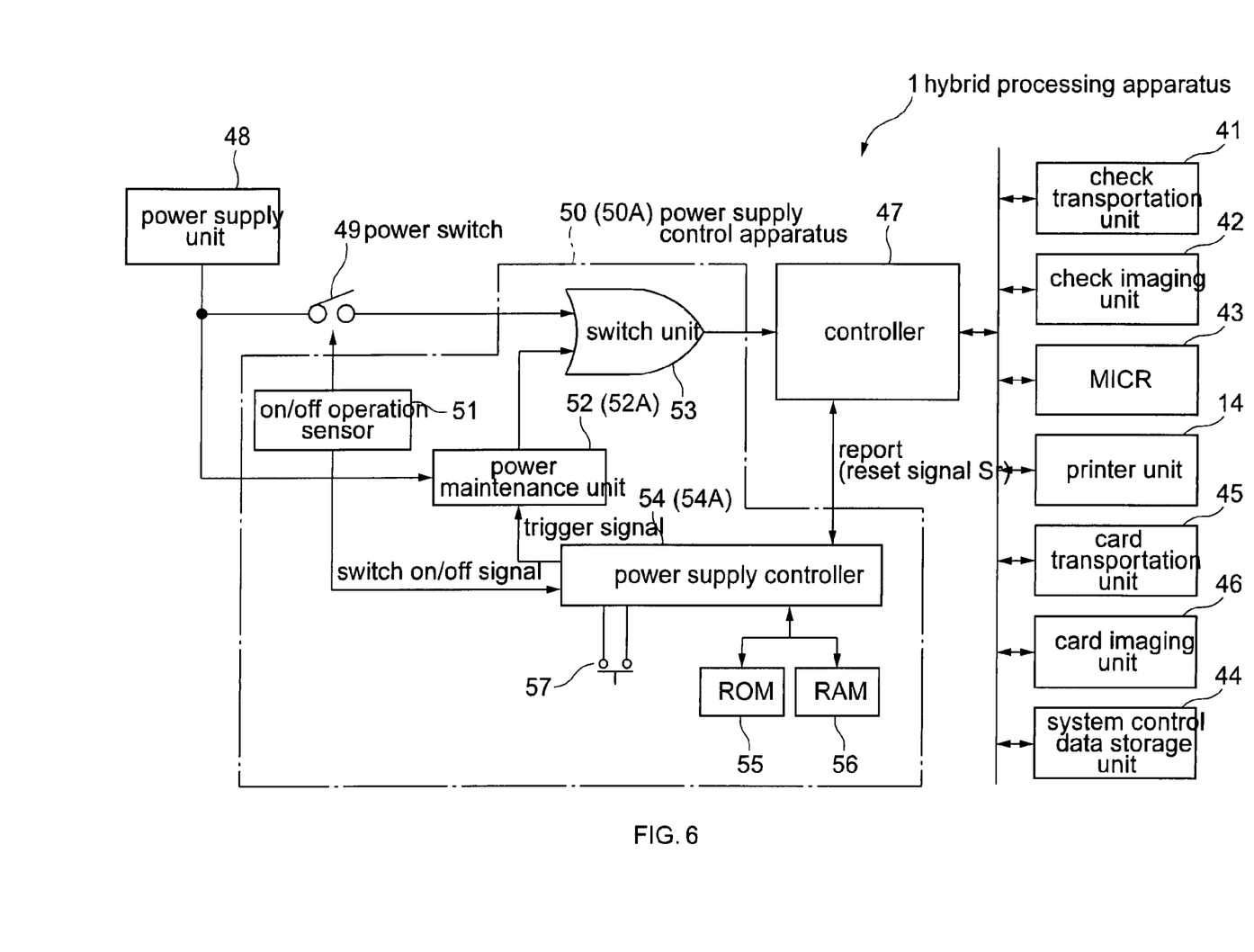
FIG. 6 is a schematic block diagram showing the arrangement of the hybrid processing apparatus shown in FIG. 1.

FIG. 6 is a schematic block diagram of the hybrid processing apparatus 1.

As shown in FIG. 6, this hybrid processing apparatus 1 has a check transportation unit 41 for conveying checks S, a check imaging unit 42 for capturing an image of the check S while the check S is being transported through the transportation path, a MICR 43 for reading magnetic ink characters printed on the transported check S, a printer unit 14 for printing on the check S, a system control data storage unit 44 for storing information (such as the head capping and ink system data) during the shutdown process, a card transportation unit 45 for conveying cards C, a card imaging unit 46 for capturing an image of the card C, a controller 47 (control circuit) for controlling the foregoing units, a power supply unit 48 for converting power from an AC source to power that can be used by the hybrid processing apparatus, a power switch 49 for turning the power on and off, and a power supply control apparatus 50.

The check imaging unit 42 and card imaging unit 46 consist of the same first image scanning sensor 11 and second image scanning sensor 12.

The printer unit 14 is an inkjet printer, and is described in further detail below.

Detailed Description of the Printer Unit 14

Figure 7:
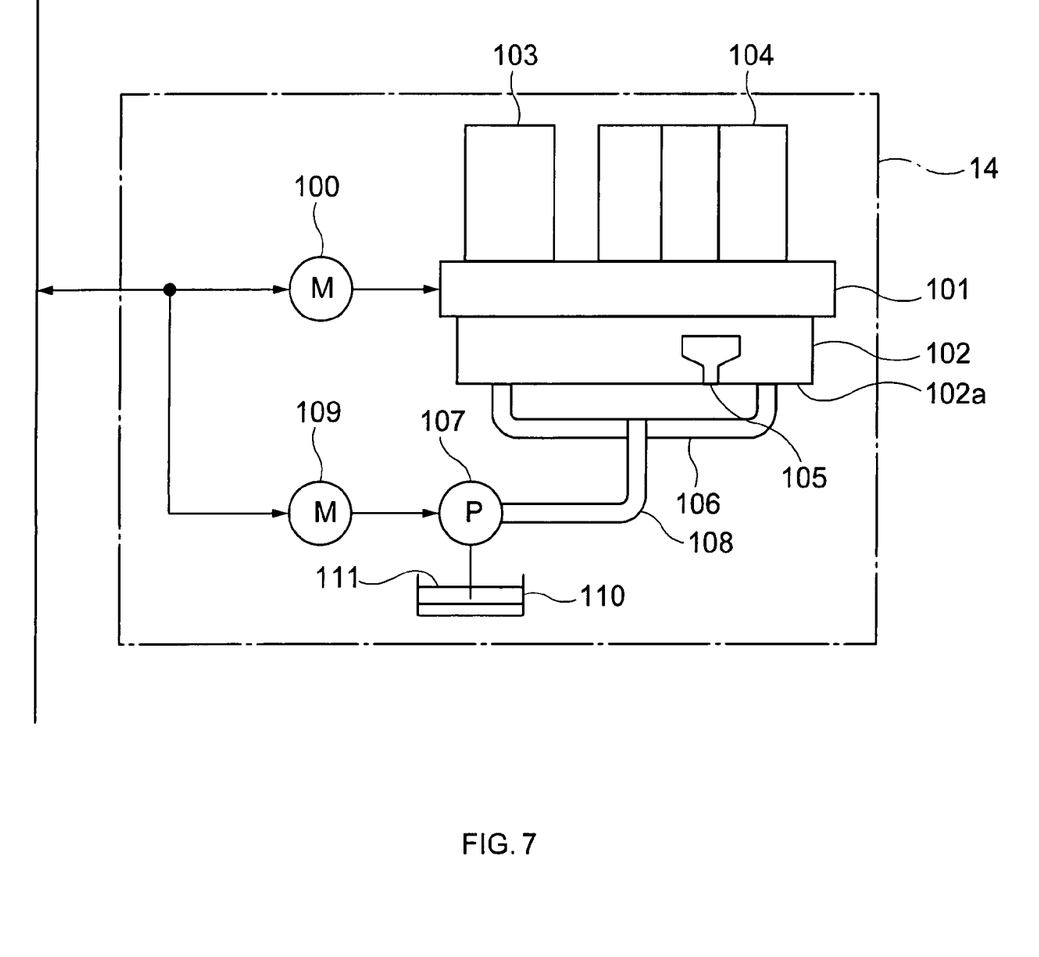
FIG. 7 shows the arrangement of the printer section of the hybrid processing apparatus shown in FIG. 1.

FIG. 7 is a schematic block diagram showing the arrangement of the printer unit 14.

As shown in FIG. 7, the printer unit 14 has a carriage 101 that is driven bidirectionally in a main scanning direction (that is, perpendicular to the transportation direction of the check S) by a carriage motor 100. A print head 102 is disposed on the bottom part of this carriage 101. Ink cartridges 103, 104 (one containing black ink and one containing color ink) for supplying ink to the print head 102 are removably installed on top of the carriage 101.

A cap 106 for sealing the nozzles 105 of the print head 102 is located at one end (the home position) in the direction of carriage 101 movement. A vacuum pump 107 is connected to the cap 106 through a pump tube 108 for producing negative pressure inside the cap 106 when the cap 106 has sealed the nozzles 105. The vacuum pump 107 is driven by a motor 109, and ink vacuumed by the vacuum pump 107 is absorbed by a waste ink absorbent 111 disposed inside a waste ink tray 110.

The printer unit 14 normally executes a cleaning process to prevent deterioration in print quality. This cleaning process forcibly vacuums and discharges ink remaining in the nozzles 105 by means of the vacuum pump 107 creating negative pressure inside the cap 106 when the nozzles 105 are sealed by the cap 106, and wipes the nozzle plate 102a by means of a wiping member not shown after vacuuming and discharging the residual ink. This cleaning process prevents clogging of the nozzles 105 in the print head 102, and purges air bubbles in the ink path communicating with the nozzles 105.

The cleaning process is run (1) each time the power turns on, (2) when the power turns on if a specified set time (such as two or three days) has passed since the last cleaning process, (3) when a cleaning switch (not shown) is pressed, or (4) when a cleaning process button is operated on the display of the host computer (not shown in the figure), but is described below as being run (1) each time the power turns on.

As shown in FIG. 6, the power supply control apparatus 50 has a on/off operation sensor 51 for detecting if the power switch 49 is turned on or off, a power maintenance unit 52, a switch unit 53, and a power supply controller 54.

The power maintenance unit 52 can assume one of three states: a power-on state, power-off state, and a limited-power-on state in which the power maintenance unit 52 holds the power supply in an on state for a predetermined period of time (the "specified time" below) when a specific trigger signal is applied.

The switch unit 53 outputs power acquired from the power supply unit 48 through the power switch 49 and power acquired therefrom through the power maintenance unit 52 to the controller 47 of the hybrid processing apparatus 1.

The power supply controller 54 controls the power maintenance unit 52 based on a switch on/off signal input from the on/off operation sensor 51, and reports the on/off state of the power switch 49 to the controller 47 of the hybrid processing apparatus 1.

The power supply controller 54 is a single-chip semiconductor integrated circuit such as a microcontroller. ROM 55 for storing a control program and RAM 56 used in the operation of the power supply controller 54 are connected to the power supply controller 54.

The power supply controller 54 normally sets the power maintenance unit 52 to the power-on state, and inputs the trigger signal to change the power maintenance unit 52 to the limited-power-on state when the on/off operation sensor 51 detects that the power switch 49 is switched off. As a result, power continues to be supplied for a specified time to the hybrid processing apparatus 1, including the power supply control apparatus 50, after the power switch 49 is turned off. If the trigger signal is input again before this specified time passes, supplying power can be extended for another specified time. This continues until the shutdown process ends. When the shutdown process ends, the power maintenance unit 52 is set to the power-off state, at which time supplying power ends.

Furthermore, by setting the power maintenance unit 52 to the power-off state without waiting for the shutdown process to end if the shutdown process does not end within the specified time, an unsafe system condition resulting from the shutdown process not ending can be prevented.

If the on/off operation sensor 51 detects that the power switch 49 was turned on again after the power supply to the hybrid processing apparatus 1, including the power supply control apparatus 50, is turned off and before the power supply controller 54 and controller 47 reach the reset voltage Vr at which the power supply controller 54 and controller 47 stop operating, the power supply controller 54 applies a restart command to the controller 47 of the hybrid processing apparatus 1 to reset and reboot the hybrid processing apparatus 1. The power supply controller 54 functions as a startup process command means in this situation. More particularly, the power supply controller 54 asserts a startup command that omits the cleaning process if the on/off operation sensor 51 detects that the power switch 49 was turned on again before the specified time in which power supply to the hybrid processing apparatus 1 is maintained passes.

Figure 8:
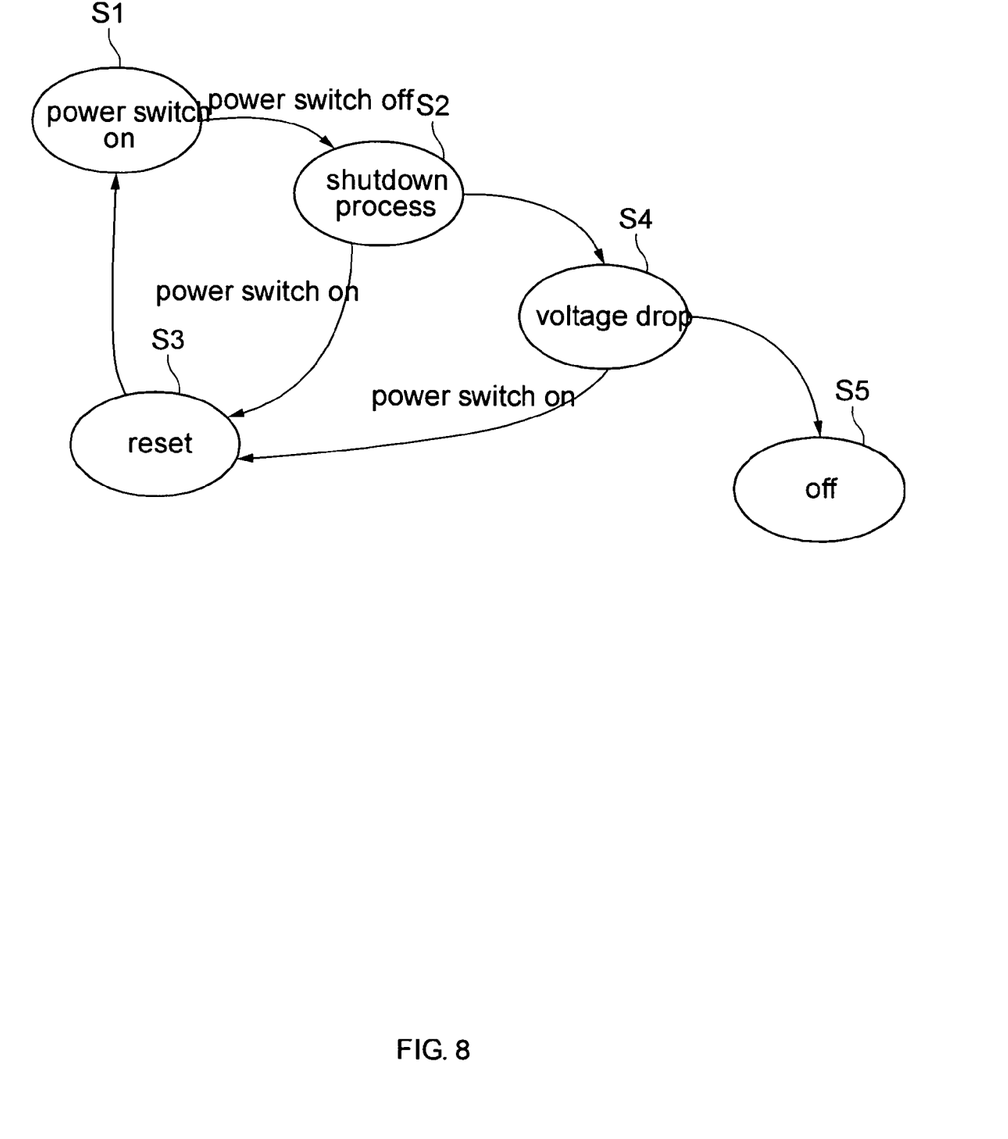
FIG. 8 is a state transition diagram describing the operation of the hybrid processing apparatus shown in FIG. 1.

FIG. 8 is a state transition diagram describing the operation of the device in conjunction with operation of the power switch 49.

Referring to FIG. 8, if the power switch 49 is in the on state (S1) and is then turned off, the shutdown process (S2) starts and the power supply is maintained for the specified time needed to complete the shutdown process, such as a head capping process.

If the power switch 49 is turned on again within this specified time for running this head capping process, the reset state (S3) is entered when the head capping process ends, the system thus restarts, and the power switch 49 returns to the on state (S1).

If the specified time passes, or if the power supply cut-off switch 57 is operated to turn the power maintenance unit 52 off, the voltage drop state (S4) is entered to stop supplying power. If the power switch 49 is turned on again after this voltage starts to drop and before the voltage reaches the reset voltage Vr, the reset state (S3) is entered. In this case the hybrid processing apparatus 1 runs the normal startup process and thus executes the cleaning process in the same way as when the power switch is turned on from the normal power-off state, and thus returns to the normal power switch 49 on state (S1). If the supply voltage drops to or below the reset voltage Vr, the hybrid processing apparatus 1 enters the power-off state (S5).

Operation of the Power Supply Control Apparatus 50

Figure 9:
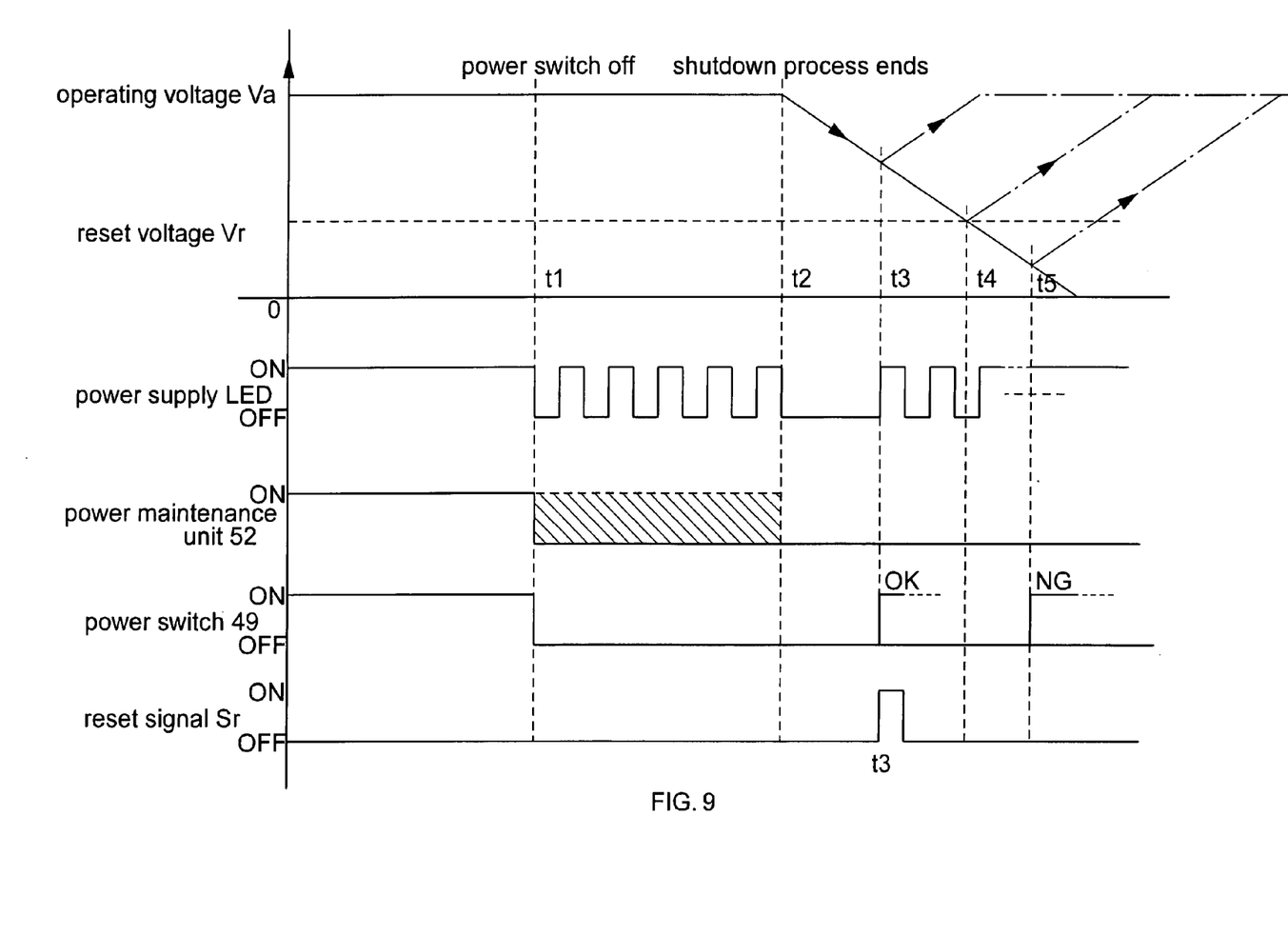
FIG. 9 is a waveform diagram describing the operation of the hybrid processing apparatus shown in FIG. 1.

FIG. 9 is a timing chart describing the operation of the power supply control apparatus 50.

When the power switch 49 turns on and power is thus supplied to the system, operating voltage Va is applied to the hybrid processing apparatus 1 and power supply control apparatus 50. The power maintenance unit 52 is also set to the power-on state. When operating voltage Va is applied to the power supply control apparatus 50 and the system is operating, a power supply LED (not shown) disposed to the power maintenance unit 52 is on.

This power supply LED could also turn on when the operating voltage Va is applied to the power supply control apparatus 50 and the system is not operating. In this case the power supply LED turns off naturally when the supply voltage drops.

If the power switch 49 is turned off while the hybrid processing apparatus 1 and power supply control apparatus 50 are operating (such as at time t1), input from the power supply line to which the power switch 49 is connected to the switch unit 53 goes LOW. Output from the switch unit 53 is held HIGH, however, because the power maintenance unit 52 remains on. Power therefore continues to be supplied to the power supply control apparatus 50 and hybrid processing apparatus 1.

The on/off operation sensor 51 detects if the power switch 49 is turned off, and then inputs a switch-off signal to the power supply controller 54. When this switch-off signal is input the power supply controller 54 switches the power maintenance unit 52 to the power maintenance mode by applying the trigger signal to the power maintenance unit 52. The power maintenance unit 52 is thus activated.

The trigger signal causes the power maintenance unit 52 to operate for a predetermined time (the specified time), and the power maintenance unit 52 thus continues to supply power from the power supply unit 48 to the switch unit 53 for this specified time. Power supply to the power supply control apparatus 50 and hybrid processing apparatus 1 is thus maintained for this specified time. More specifically, the power supply to the power supply control apparatus 50 and hybrid processing apparatus 1 is not cut off immediately when the power switch 49 is turned off, but instead stops when this specified time has passed.

If the trigger signal is input again before this specified time passes, this specified time can be extended.

The power maintenance unit 52 also changes the power supply LED from a steady state to a blinking state when the trigger signal is input.

When the specified time passes or the power maintenance unit 52 turns off, power maintenance unit 52 output goes LOW and power supply to the power supply control apparatus 50 and hybrid processing apparatus 1 stops. More specifically, power supply to the power supply control apparatus 50 and hybrid processing apparatus 1 stops for the first time at time t2 in this hybrid processing apparatus 1. The power maintenance unit 52 also causes the power supply LED to light steady at time t2 when the specified time has passed or the power maintenance unit 52 turns off. Furthermore, the operating voltage Va drops gradually rather than going immediately to the reset voltage Vr or less due to the circuit capacity of these devices even though power is not supplied to the power supply control apparatus 50 and hybrid processing apparatus 1, and the power supply LED therefore gradually starts to blink and then turns off as the voltage drops.

The power supply controller 54 can thus continue operating until the operating voltage Va goes to the reset voltage Vr, and can thus monitor the operation of the power switch 49 based on the output of the on/off operation sensor 51. If the power supply controller 54 detects that the power switch 49 was turned on again during this time, the power supply controller 54 inputs the reset signal Sr to the controller 47 of the hybrid processing apparatus 1.

If the supply voltage goes to the reset voltage Vr at time t4, for example, and the power switch 49 is turned on again at time t3 before time t4, the reset signal Sr is output at time t3 as shown in FIG. 9, and the operating voltage Va gradually rises.

However, if the power switch 49 is turned on at time t5 after time t4 at which the reset voltage Vr is reached, the operating voltage Va gradually rises as shown in FIG. 9 but the reset signal Sr is not output because the power supply controller 54 is not operating. If power is supplied and the reset signal Sr is input while the power supply controller 54 is still operating, that is, before the voltage goes to the reset voltage Vr, the controller 47 of the hybrid processing apparatus 1 starts operation of the printer unit 14.

If the startup process that is run at this time does not include a cleaning process, the printer unit 14 starts operation without running the cleaning process. If power is supplied after the voltage goes to the reset voltage Vr, operation is the same as when the power is turned off from a normal power off condition, and printer startup includes the cleaning process.

When the power to a hybrid processing apparatus 1 having a power supply control apparatus 50 according to this embodiment of the invention is turned off, the power supply control apparatus 50 thus continues to supply power for the time required to complete the shutdown process after the power is turned off. Furthermore, if an operation turning the power on again is detected after the power switch is turned off and before the reset voltage Vr at which the hybrid processing apparatus 1 shuts down, a command instructing a reset and restart is applied to the controller 47 of the hybrid processing apparatus 1. Even more particularly, if an operation turning the power on again is detected during the time required to complete the shutdown process after an operation turning the power off is detected, a command causing the system to restart without executing a cleaning process is applied to the controller 47 of the hybrid processing apparatus 1.

The hybrid processing apparatus 1 can therefore be quickly restored to a usable state when the power is turned off because the hybrid processing apparatus 1 is restarted without executing the cleaning process that is normally run when the hybrid processing apparatus 1 is turned on if an operation turning the power on is executed while the power supply is maintained for the time required to complete the shutdown process after the power is turned off.

Furthermore, because the state of the power switch 49 and the operating state of the system match, the operating state of the apparatus can be known by looking at an illumination means associated with the power switch even if the power switch is a seesaw switch or a push-button switch that turns on when depressed and turns off when pressed again, and the operating state of the switch will thus not seem unnatural.

Furthermore, a hybrid processing apparatus that is easy to use can be provided because the frequency of running a specific process when the power is turned on is reduced, the system restarts quickly when said process is not run, and the state of the power switch 49 matches the operating state of the system.

A hybrid processing apparatus 1 having a printer unit 14 (inkjet printer) that cleans the print head 102 when the power is turned on is used by way of example as an electronic device in the foregoing embodiment of the present invention, but this hybrid processing apparatus 1 shall not be so limited. More specifically, the present invention can be applied to any electronic device that usually runs a specific process when the power turns on but does not necessarily need to run said process, and the same effect and benefit can be achieved in such electronic devices.

More specifically, if the power supply is maintained for the time required to complete a shutdown process of an electronic device after an operation turning the power to the electronic device off is performed, a command causing the electronic device to restart without executing a specific process that is normally run when the electronic device starts up is applied to the electronic device. As a result, the electronic device can quickly resume the usable state.

The specific process run when the power is turned on is therefore executed less frequently, the electronic device can be driven and used in less time when this process is not run, and an electronic device that is easy to use can thus be provided.

When the power switch 49 is turned off and the on/off operation sensor 51 outputs a switch-off signal in this embodiment of the invention, the power supply controller 54 inputs a trigger signal to the power maintenance unit 52 to continue supplying power for a specified time. The power supply controller 54 then monitors whether the power switch 49 is turned on again until the reset voltage Vr is reached and the power supply controller 54 can no longer operate (that is, the power supply controller 54 does not manage the power supply time).

The power supply controller 54 can, however, manage the power supply using the power maintenance unit 52 as a simple on/off switch. In such an arrangement a timer function must be provided in the power supply controller 54. The operation of a power supply controller 54 having such a function is described next with reference to the flow chart in FIG. 10.

Figure 10:
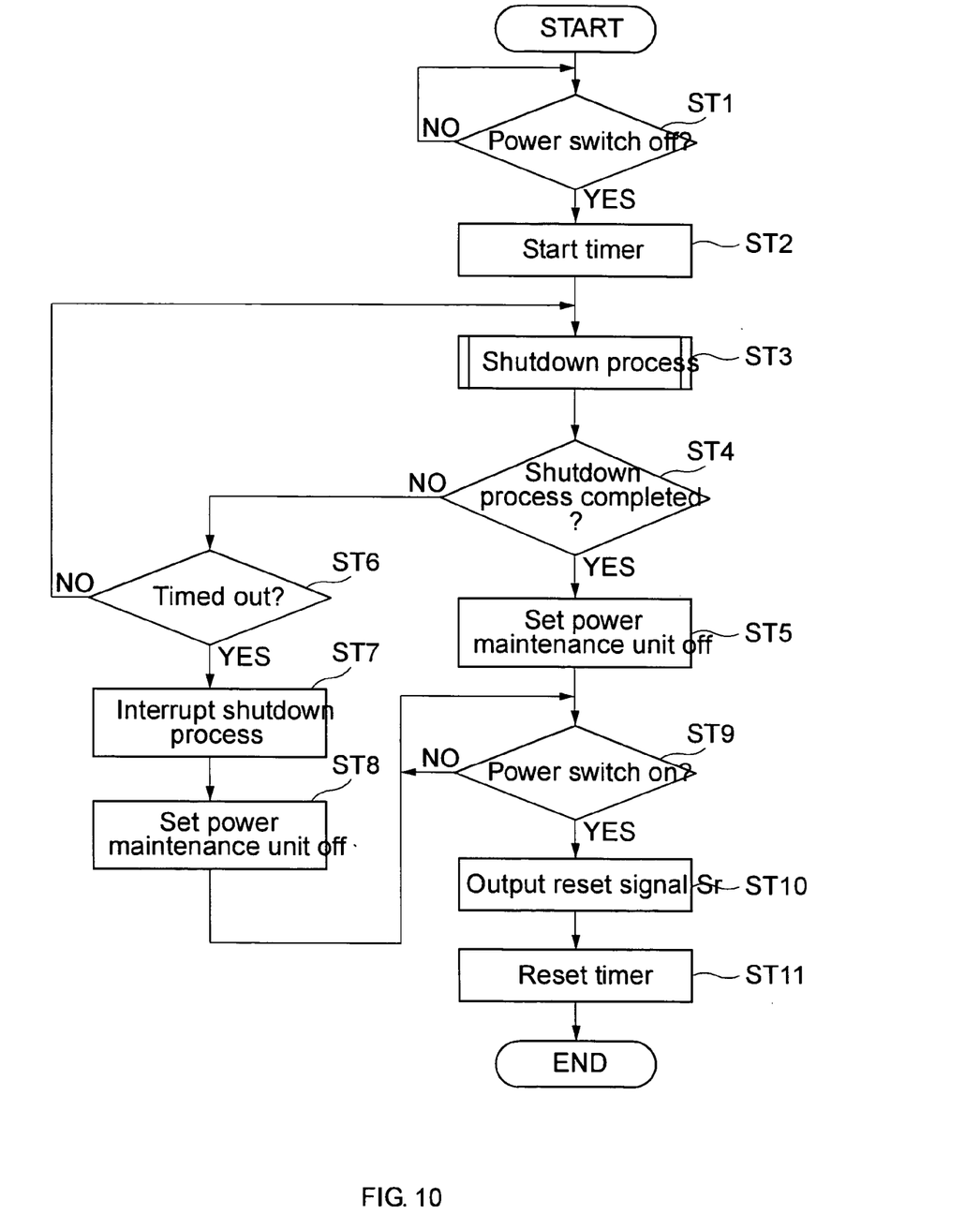
FIG. 10 is a block diagram of the operation of an hybrid processing apparatus according to another embodiment of the present invention.

FIG. 10 is a flow chart showing the operation of a power supply control apparatus according to another embodiment of the present invention. The circuit configuration of this embodiment differs from the foregoing embodiment only in that the power maintenance unit has a simple on/off function, and FIG. 6 is therefore also used in the following description of this embodiment. However, the power supply control apparatus in this embodiment is denoted power supply control apparatus 50A, the power maintenance unit in this power supply control apparatus is denoted power maintenance unit 52A, and the power supply controller is denoted power supply controller 54A to differentiate the power supply control apparatus of this embodiment from the power supply control apparatus 50 of the preceding embodiment.

The operation described in FIG. 10 assumes that the power maintenance unit 52A is already in the on state. Whether the power switch 49 was turned off is then determined (ST1), and step ST1 repeats while the power switch 49 remains in the off position. When the power switch 49 turns off, a timer that measures a specific time (the power supply maintenance time) is started (ST2). The shutdown process is executed after the timer starts (ST3). The shutdown process is executed within this specified time. The shutdown process also monitors whether the timer times out. More specifically, whether the shutdown process has ended is determined (ST4). If the shutdown process ended (ST4 returns yes), the power maintenance unit 52A is turned off (ST5).

However, if the shutdown process has not ended (ST4 returns no), step ST6 determines if the timer has timed out (ST6). If the timer has not timed out (ST6 returns no), control returns to step ST3. If the timer has timed out (ST6 returns yes), the shutdown process is interrupted (ST7) and the power maintenance unit 52A is turned off (ST8). The power maintenance unit 52A thus turns off when the shutdown process ends, but if the timer times out during the shutdown process, the shutdown process is interrupted and the power maintenance unit 52A is turned off. Unsafe conditions resulting from the shutdown process not ending can thus be prevented.

Whether the power switch 49 turned on again after the shutdown process ended is then determined (ST9). If the power switch 49 did not turn on (ST9 returns no), this step repeats. If the power switch 49 did turn on again (ST9 returns yes), the reset signal Sr is output (ST10). The timer is then reset (ST11) after the reset signal Sr is output. If the power switch 49 does not turn on again after the specified time passes and before the operating voltage Va reaches the reset voltage Vr, the reset signal Sr is not output and the timer is not reset. Note that the timer resets automatically if the operating voltage Va drops to or below the reset voltage Vr, and a reset operation is therefore unnecessary. Furthermore, if a power on operation is executed during the specified time, that is, the power supply maintenance time, power supply to the hybrid processing apparatus 1 and power supply control apparatus 50A continues.

The power supply control apparatus 50A of the present embodiment and the power supply control apparatus 50 of the preceding embodiment can thus reduce how frequently a specific process that is usually run when the power turns on is actually executed. The system can restart in a short time when this specific process is not run, and the state of the power switch 49 always matches the operating state of the system. The present invention thus affords a hybrid processing apparatus that is easy to use.

APPLICATION IN INDUSTRY

The present invention can be applied in any electronic device that runs a specific process when the power supply to the system turns on or turns off, including, for example, an inkjet printer that runs a cleaning process when the power is turned on.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A power supply control apparatus for controlling the operation of a power supply in an electronic device that runs a program for shutdown and/or start up when the power supply in the device turns on or off, comprising:
   an on/off operation detection circuit for detecting when the power supply of the electronic device is turned on or off;
   a power maintenance circuit responsive to when said on/off operation detection circuit detects turn off of said power supply for causing said power supply to continue to supply power to the electronic device for a specified time or until said power supply output drops to a predetermined power supply reset voltage; and
   a startup process control circuit responsive to said power maintenance circuit for asserting a command to reset and restart the electronic device if said on/off operation detects the power supply being turned on during the interval of time following when an operation turning the power supply to the electronic device off is detected to when said predetermined reset voltage is reached.

2. The power supply control apparatus as described in claim 1, wherein the startup process control circuit asserts a command instructing the electronic device to omit a specific startup operation if an operation turning the electronic device on is detected before the specified time period has expired.

3. The power supply control apparatus as described in claim 2, further comprising an illumination indicator for providing a lighting signal indicating the switching position of a switching device for turning the power of the electronic device on and off,
   wherein the illumination indicator comprises a lighting source which provides a steady light when the electronic device is in a normal operating state, blinks during the specified time period after the power supply to the electronic device is turned off, and operates to provide a light other than said steady or blinking light until said reset voltage and/or the expiration of said specified time has occurred.

4. The power supply control apparatus as described in claim 3, wherein the electronic device comprises a printing device that cleans the printing unit when device power turns on; and
   the startup process control circuit asserts a command instructing the printing device to omit the cleaning process if an operation turning the printing device on is detected before reaching the expiration of said specified time.

5. The power supply control apparatus as described in claim 4, further comprising a time measuring circuit for measuring the specified time during which power to the electronic device is maintained after an operation turning the electronic device power off is detected; and
   a power supply stopping switch device responsive to the time measuring circuit for disabling the power maintenance circuit if a specific shutdown process of the electronic device has not ended when the specified time measured by the time measuring circuit has passed.

6. A power supply control method for use in an electronic device that runs a particular shutdown process when the power supply of the electronic device turns off comprising:
   detecting an operation that turns the power supply to the electronic device on or off;
   continuing to supply power to the electronic device until a specified time has elapsed or until the output voltage of the power supply drops to a predetermined reset voltage in response to when an operation turning the device power supply off is detected; and outputting a command to reset and restart the electronic device if an operation turning the device power supply on is detected during the time period from when an operation turning the device power supply off is detected to when said specified time has been reached or when the power supply reset voltage is reached.

7. A power supply control method as described in claim 6 wherein said method includes a program for operating a startup process command output procedure for outputting a command to reset and restart the electronic device if an operation turning the device power supply on is detected during the period from when an operation turning the device power supply off is detected to when the reset voltage at which the electronic device stops operating is reached.

8. A power supply control apparatus for controlling the operation of a power supply in an electronic device that runs a program for shutdown and/or start up when the power supply in the device turns on or off, comprising:

means for detecting when the power supply of the electronic device is turned on or off;

means responsive to when said on/off operation detection circuit detects turn off of said power supply for causing said power supply to continue to supply power to the electronic device for a specified time or until said power supply output drops to a predetermined power supply reset voltage; and means responsive to said power maintenance circuit for asserting a command to reset and restart the electronic device if said on/off operation detects the power supply being turned on during the interval of time following detection of turn off of the power supply to the electronic device to detection of when said predetermined reset voltage is reached.

* * * * *